US006959955B2

(12) United States Patent
Carter, III et al.

(10) Patent No.: US 6,959,955 B2
(45) Date of Patent: Nov. 1, 2005

(54) STORAGE APPARATUS FOR AUTOMOBILES

(75) Inventors: Robert B. Carter, III, Newport Beach, CA (US); Vincent Alexander Baxter, Corona Del Mar, CA (US); W. Eric Garris, Durham, NC (US); H. Kurt Menke, Raleigh, NC (US); David S. DeVerter, Raleigh, NC (US)

(73) Assignee: Markets Direct, Inc., Dallas, TX (US)

( * ) Notice: Subject to any disclaimer, the term of this patent is extended or adjusted under 35 U.S.C. 154(b) by 0 days.

(21) Appl. No.: 10/644,508

(22) Filed: Aug. 19, 2003

(65) Prior Publication Data
US 2004/0036321 A1 Feb. 26, 2004

Related U.S. Application Data

(63) Continuation of application No. 10/032,018, filed on Dec. 18, 2001, now Pat. No. 6,607,228.

(51) Int. Cl.[7] .................................................. B60N 3/12
(52) U.S. Cl. ..................... 296/37.6; 296/3; 296/26.09; 296/100.16
(58) Field of Search ............................ 296/37.6, 24.1, 296/37.7, 37.16, 37.18, 37.1, 180.1, 37.5, 195, 100.16, 100.02, 100.03, 100.06, 24.2, 3; 224/542, 404, 549; 410/129

(56) References Cited

U.S. PATENT DOCUMENTS

| | | | | |
|---|---|---|---|---|
| 4,770,458 A | * | 9/1988 | Burke et al. ................. 296/3 |
| 4,779,916 A | * | 10/1988 | Christie ........................ 296/3 |
| 4,828,315 A | * | 5/1989 | Muirhead ............... 296/100.02 |
| 4,938,519 A | | 7/1990 | Schlachter |
| 5,016,932 A | | 5/1991 | Carter |
| D321,159 S | | 10/1991 | Schlachter |
| 5,139,375 A | * | 8/1992 | Franchuk ............... 296/100.16 |
| 5,190,337 A | * | 3/1993 | McDaniel ...................... 296/3 |
| 5,192,107 A | * | 3/1993 | Smith, Sr. ..................... 293/3 |
| 5,324,089 A | | 6/1994 | Schlachter |
| 5,423,587 A | * | 6/1995 | Ingram ......................... 296/3 |
| 5,476,301 A | * | 12/1995 | Berkich ......................... 296/3 |
| 5,498,049 A | | 3/1996 | Schlachter |
| 5,560,666 A | * | 10/1996 | Vieira et al. .................. 296/3 |
| 5,564,768 A | | 10/1996 | Saffold |
| 5,564,776 A | | 10/1996 | Schlachter |
| 5,598,962 A | | 2/1997 | Schlachter |
| 5,692,791 A | * | 12/1997 | Sulzer .......................... 296/3 |
| 5,725,137 A | * | 3/1998 | Macdonald .................... 296/3 |
| 5,741,038 A | * | 4/1998 | Fowler et al. ................. 296/3 |
| 5,782,596 A | * | 7/1998 | Young et al. ............... 414/563 |
| 5,806,905 A | * | 9/1998 | Moore ........................... 296/3 |
| 5,868,453 A | * | 2/1999 | Steigner ........................ 296/3 |
| 5,927,782 A | * | 7/1999 | Olms ............................ 296/3 |
| 5,992,719 A | | 11/1999 | Carter, III |
| D420,969 S | | 2/2000 | Schlachter |
| 6,059,159 A | | 5/2000 | Fisher |
| 6,059,341 A | | 5/2000 | Jensen et al. |

(Continued)

Primary Examiner—Kiran Patel
(74) Attorney, Agent, or Firm—Eric K. Satermo

(57) ABSTRACT

A storage enclosure includes a base including a top panel extending transversely from a front panel. The base is attachable to a load deck of an open deck vehicle such that an enclosed space is defined by the front and top panels and the load deck. The base includes mounts within the enclosed space that are attachable to a bracket for attaching the base to the load deck. The top panel includes side portions that extend from opposite ends of the front panel, and a removable cover panel is disposed between the side portions. A cage is mounted to the base that defines a cage compartment above the top panel. The cage includes legs that extend through the base and are engaged by locking elements to removably secure the cage to the base. The cage includes frame segments that are releasably connected to one another by release pins.

10 Claims, 6 Drawing Sheets

U.S. PATENT DOCUMENTS

| | | | |
|---|---|---|---|
| 6,065,792 A | * | 5/2000 | Sciullo et al. .......... 296/26.09 |
| 6,065,794 A | | 5/2000 | Schlachter |
| 6,082,804 A | | 7/2000 | Schlachter |
| 6,113,179 A | | 9/2000 | Zigeti |
| 6,170,724 B1 | | 1/2001 | Carter et al. |
| 6,174,012 B1 | | 1/2001 | Saffold |
| 6,347,731 B1 | * | 2/2002 | Burger ....................... 224/405 |
| 6,425,618 B1 | * | 7/2002 | Garland et al. ................ 296/3 |
| 6,598,922 B2 | * | 7/2003 | Morse et al. .............. 296/37.6 |
| 6,607,228 B2 | * | 8/2003 | Carter et al. ................... 296/3 |
| 6,644,704 B1 | * | 11/2003 | Nyberg ......................... 296/3 |
| 6,758,508 B2 | * | 7/2004 | Weyhrich ..................... 296/3 |

* cited by examiner

STORAGE APPARATUS FOR AUTOMOBILES

RELATED APPLICATION INFORMATION

This application is a continuation of U.S. application Ser. No. 10/032,018 filed on Dec. 18, 2001 now U.S. Pat. No. 6,607,201. The priority of the prior application is expressly claimed, and the disclosure of the priority application is hereby incorporated by reference in its entirety.

FIELD OF THE INVENTION

The present invention relates generally to storage enclosures for vehicles, and more particularly to storage enclosures that are mountable to a load deck of an open deck vehicle, such as a jeep, sport utility vehicle, or other truck.

BACKGROUND

Open deck vehicles, such as jeeps and pickup trucks, include a load bed or open load deck in which articles may be stored and/or transported. One of the problems with such open load decks is that articles stored in them are exposed, and therefore may be subject to theft or unauthorized use. To increase security, bed covers are available that may be extended over the load bed, e.g., of pickup trucks. Alternatively, containers, such as tool chests and the like, may be mounted or otherwise placed in the load bed for storing tools or other articles.

In addition, enclosures are available that may isolate all or a portion of the load deck to provide a secure storage area in the load deck. Such enclosures generally include an "L" shaped panel that may be installed generally in close proximity to a tailgate of the vehicle. With the tailgate open, the interior of the enclosure may be accessed to store or remove articles. With the tailgate closed, articles may be securely stored within the enclosure.

Accordingly, storage enclosures for open deck vehicles would be considered useful.

SUMMARY OF THE INVENTION

The present invention is directed to storage enclosures that are mountable to a load deck of an open deck vehicle, such as a jeep, sport utility vehicle, or other truck, the load deck generally being defined by a floor, side walls, and a tailgate.

In accordance with one aspect of the present invention, a storage enclosure apparatus is provided that includes a base including a front panel and a top panel extending transversely from the front panel. The base may be attachable to a load deck such that an enclosed space is at least partially defined by the front and top panels. The enclosed space may be further defined by a floor, side walls, and/or a tailgate of the load deck after the base is installed within the load deck.

The base may include one or more mounts on the front panel and/or the top panel that are disposed within the enclosed space. Each mount may be attachable to a bracket for attaching the base to the load deck. In a preferred embodiment, the mount includes a slot and a hole extending transversely through the slot, the hole being configured for receiving a pin therethrough for securing a portion of a bracket received in the slot.

The apparatus may also include a bracket including first and second portions extending transversely relative to one another. The first portion may be attachable to the mount such that the second portion may be mounted to a load deck of a vehicle. Preferably, the second portion of the bracket extends generally parallel to the top panel for attaching the second portion to a floor of a load deck of a vehicle. More preferably, the bracket is an existing bracket for mounting other equipment to the load deck, such as a passenger seat. Alternatively, the bracket may include a foot and/or one or more claws for securing the mount to an existing floor mount in the load deck.

In one embodiment, the top panel may include side portions that extend from opposite ends of the front panel, thereby defining an opening therebetween for accessing the enclosed space. The top panel may also include a cover panel disposed between the side portions, and preferably removable from between the side portions. A tongue or a groove may be provided on the side portions and/or the cover panel for supporting the cover panel between the side portions. Preferably, the side portions and the cover panel include cooperating tongues and grooves for slidably inserting the cover panel between the side portions to attach the cover panel to the base. Alternatively, the cover panel may be connected to the base by one or more hinges, e.g., along the top of the front panel, to allow the cover panel to be lifted to access the enclosed space.

For additional stability, optionally, the side portions of the top panel may include mounts for securing to the side walls of the load deck. Alternatively, the base may include side panels extending from side edges of the top panel along opposite edges of the front panel, thereby further defining the enclosed space. The side panels may include mounts, e.g., apertures therethrough, for attaching the base to side walls of the load deck.

The apparatus may also include a cage mounted to the base such that the cage defines a cage compartment above the top panel. The cage may include one or more hubs or legs that extend into a preferably through the base into the enclosed space. A locking element may be provided for engaging each leg within the enclosed space to substantially secure the cage to the base. Preferably, the locking elements, such as pins received through the legs, are disengageable from the legs. Thus, the legs, and consequently, the cage, may be removable from the base when the locking elements are disengaged from the legs for separating the cage from the base. Alternatively, the base may include top mounts or brackets to which the cage may be permanently or removably secured.

In one embodiment, the cage may include first and second frame portions at least partially defining the cage compartment therebetween. The legs may extend from the first and second frame portions through the base. Preferably, the first and second frame portions include side frames disposed opposite one another, e.g., above side portions of the base. The cage may also include a front frame, a rear frame, a top frame, and/or a bottom frame extending between the side frames, thereby further defining the cage compartment.

One or more of the frame segments may be releasably connected to one another, for example, by one or more release pins. One or more locks may be provided for preventing respective release pins from being released, thereby securing the frame segment to at least one of the first and second frame portions. In a preferred embodiment, the locks may include a lock housing for encasing the respective release pin, thereby preventing access to the respective release pin.

Other objects and features of the present invention will become apparent from consideration of the following description taken in conjunction with the accompanying drawings.

DETAILED DESCRIPTION OF THE PREFERRED EMBODIMENTS

Turning now to the drawings, FIGS. 1–6 show a preferred embodiment of a storage enclosure apparatus 10, in accordance with the present invention. The apparatus 10 may be securely installed within a load deck of an automobile, e.g., an open deck vehicle, such as a jeep, sport utility vehicle, pickup truck, and the like (not shown). Generally, the apparatus 10 includes a base 12 that may be installed within a load deck. The apparatus 10 may also include one or more brackets and/or fasteners (not shown) for attaching the base 12 to the load deck. In addition, the apparatus may also include a cage 70 that may be mounted to the base 10. Thus, a storage enclosure apparatus in accordance with the present invention may provide one or more compartments for carrying and/or storing articles in a load deck of a vehicle, as described further below.

Figure 2A:
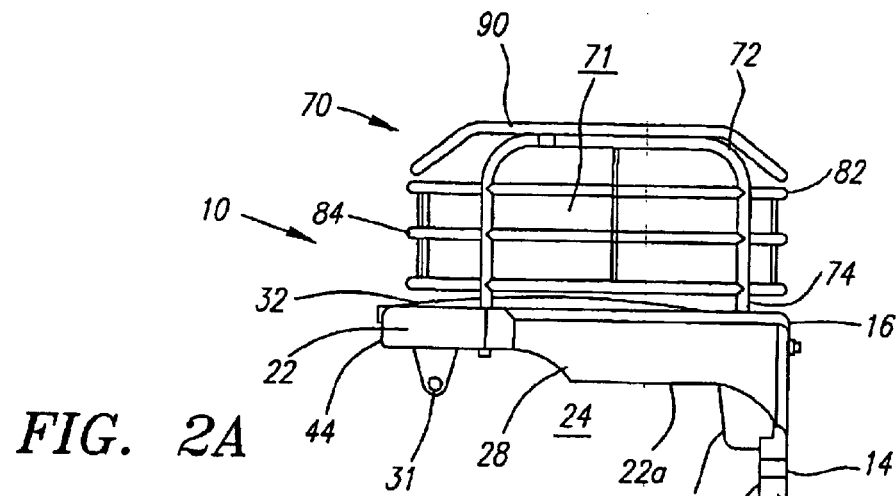
FIGS. 2A–2C are side, front, and top views, respectively, of the storage apparatus of FIG. 1.

Generally, the base 12 includes a front panel 14 defining an upper edge 16, a lower edge 18, and opposing side edges 20. A top panel 22 extends transversely from the upper edge 16 of the front panel 14 such that the front and top panels 14, 22 at least partially define an enclosed space 24. In addition, the base 12 may include one or more mounts 26 for securing the base 12 to a load deck of a vehicle (not shown), and preferably a pair of mounts 26 (best seen in FIG. 3), e.g., for increasing stability and strength of the base 12. The mounts 26 may extend from an interior surface 16a of the front panel 14 and/or an interior surface 22a of the top panel 22. Preferably, the mounts 26 extend away from the top panel 22 along the interior surface 14a of the front panel 14 towards the lower edge 18 of the front panel 14. Thus, as best seen in FIGS. 2A and 3, the mounts 26 are preferably disposed within the enclosed space 24, which may enhance security of the base 12, as described further below.

Figure 3:
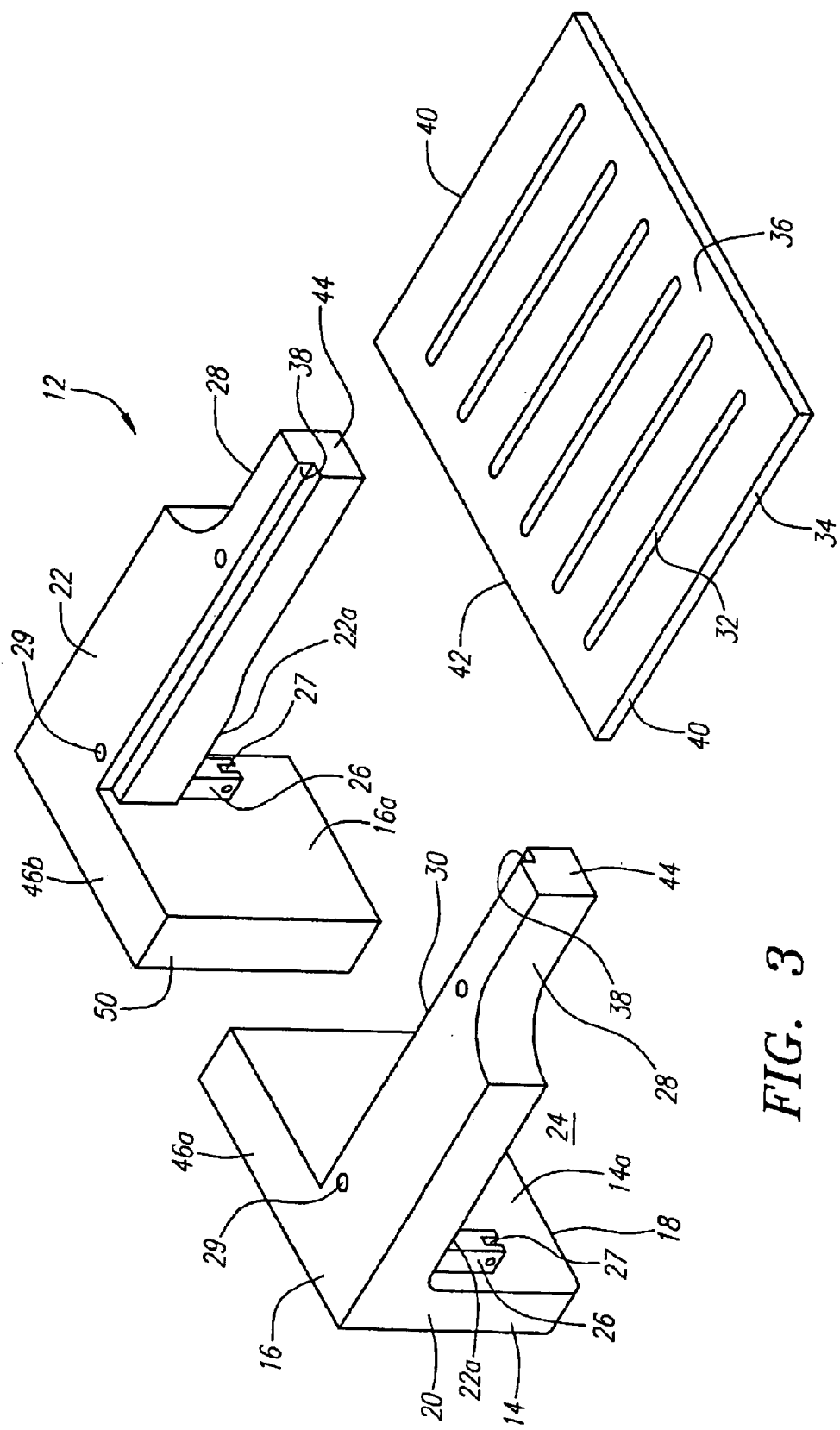
FIG. 3 is an exploded perspective view of the base of the storage apparatus of FIG. 1, including base subassemblies and a cover panel.

With particular reference to FIG. 3, the top panel 22 may include side portions 28 that extend transversely from the front panel 14 at opposite ends of the upper edge 16, thereby defining an opening 30 between the side portions 28 communicating with the enclosed space 24. Preferably, the side portions 28 are substantially permanently fixed relative to the front panel 14. More preferably, the side portions 28 extend substantially perpendicularly from the front panel 14, thereby generally defining an "L" shape when viewed from the side, as best seen in FIG. 2A. Alternatively, the side portions 28 may include side panels (not shown) that extend from the respective side edges 20 of the front panel 14, thereby further defining the enclosed space 24. In a further alternative, the side portions 28 may include additional mounts 31, e.g., integrally molded flanges or separate brackets (not shown) for further securing the base 12 to a load deck of a vehicle (not shown).

The top panel 22 may also include a removable cover panel 32 that may be disposed between the side portions 28 to cover and/or substantially close the opening 30. The cover panel 32 may include one or more inlaid features, for example, indented or protruding ribs 34 on its top surface 36 and/or on its bottom surface (not shown), e.g., to enhance a structural integrity of the cover panel 32. In addition or alternatively, the cover panel 32 may include other nonstructural features, such as cup-holder pockets, inlaid trays, handles, and the like (not shown), on the top surface 36 and/or the bottom surface.

The side portions 28 may include grooves 38 for receiving side edges 40 of the cover panel 32 to support the cover panel 32 between the side portions 28. Alternatively, the side portions 28 and the cover panel 32 may include mating connectors for limiting movement of the cover panel 32 relative to the side portions 28. For example, the cover panel 32 and the side portions 28 may include complementary tongues and grooves, tabs and slots, and the like (not shown) for allowing the cover panel 32 to be slidably inserted between the side portions 32.

With a front edge 42 of the cover panel 32 disposed adjacent rear ends 44 of the side portions 28, the tongues and grooves may be aligned, and the cover panel 32 inserted across the opening 30 until the front edge 42 abuts the front panel 14. Optionally, the front edge 42 of the cover panel 32 and the top edge 16 of the front panel 14 may also include a complementary tongue and groove (not shown) that may mate with one another when the cover panel 32 is fully inserted between the side portions 28 for added security and/or structural support.

The cover panel 32 may be configured to be inserted between the side portions 28 in a single orientation, i.e., with the top surface 36 directed upwardly away from the enclosed space 24. Alternatively, the cover panel 32 may also be insertable between the side portions 28 in an "upside-down" configuration (not shown), which may expose inlaid features on the bottom surface for particular uses. In addition, the cover panel 32 may be securable at an intermediate location, e.g., such that the cover panel 32 extends partially beyond the rear ends 44 of the side portions 28 to provide a table top (not shown).

In a further alternative, the cover panel 32 may be connected to another portion of the base 12 by hinged connections (not shown). For example, one or more hinges may be provided between the upper edge 16 of the front panel 14 and the cover panel 32. Alternatively, rounded and/or elongate curved tabs and mating apertures (not shown) may be provided on the side edges 38 of the cover panel 32 and/or on the inner edges 40 of the side portions 28. One or more shock absorbers or other dampeners (not shown) may be provided to control opening and closing of the cover panel 32. Thus, the cover panel 32 may be securely received between the side portions 28 to cover the opening 30 and protect or securely store articles within the enclosed space 24, but may be easily removed, e.g., upon opening a tailgate of the vehicle, as described further below.

Figure 4A:
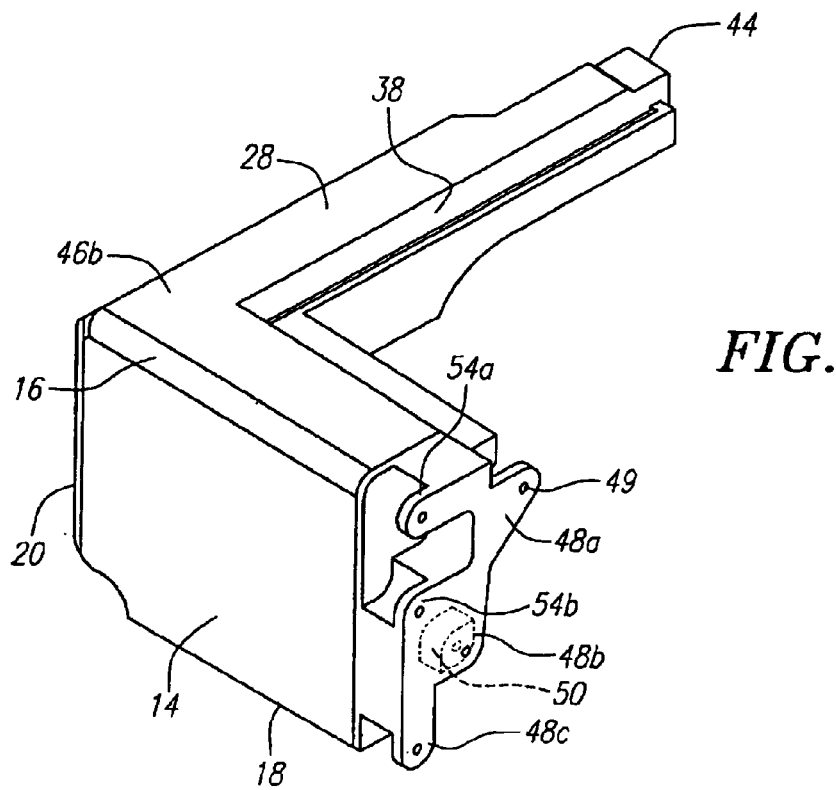
FIGS. 4A and 4B are perspective views of one of the base subassemblies shown in FIG. 3.
Figure 4B:
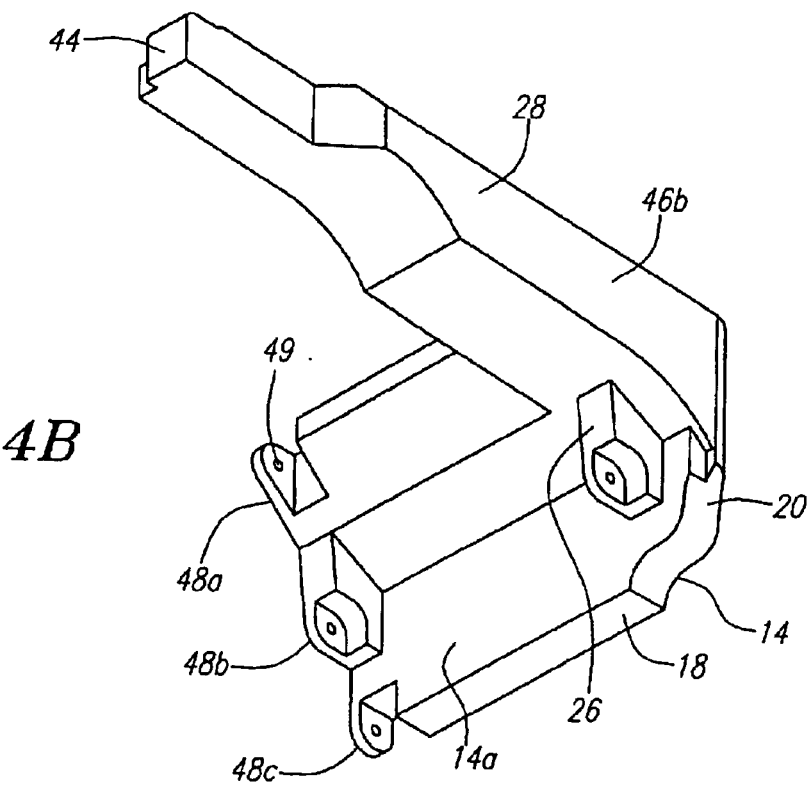

With particular reference to FIGS. 3, 4A, and 4B, the base 12 may be provided as one or more assemblies formed from materials, such as plastic, e.g., LLDPE or HDPE, fiberglass, metal, and the like. For example, the base 12 may be manufactured using conventional injection molding, extruding, rotomolding, and/or sheet metal fabrication techniques. The front panel 14 and side portions 28 may be formed as a single component including the mounts 26. The cover panel 32 may then be formed as a separate component, including any inlaid features, tongues, grooves, and the like, formed therein, e.g., during molding. Alternatively, the base 12 may be provided as a single assembly, e.g., with the cover panel 32 substantially permanently attached to the front panel 14 and/or side portions 28 such that the cover panel 32 is not removable.

In another embodiment, best seen in FIG. 3, the front panel 14 and side portions 28 of the base 12 may be manufactured as a plurality of subassemblies, e.g., each being separately molded or extruded. Dividing the base 12 into subassemblies may facilitate manufacturing, handling, and/or shipping, as compared to a base 12 formed as single component (not shown). Preferably, the front panel 14 is divided in half along a centerline of the base 12, and the base 12 is manufactured as symmetrical opposite hand base subassemblies 46a, 46b.

Figure 1:
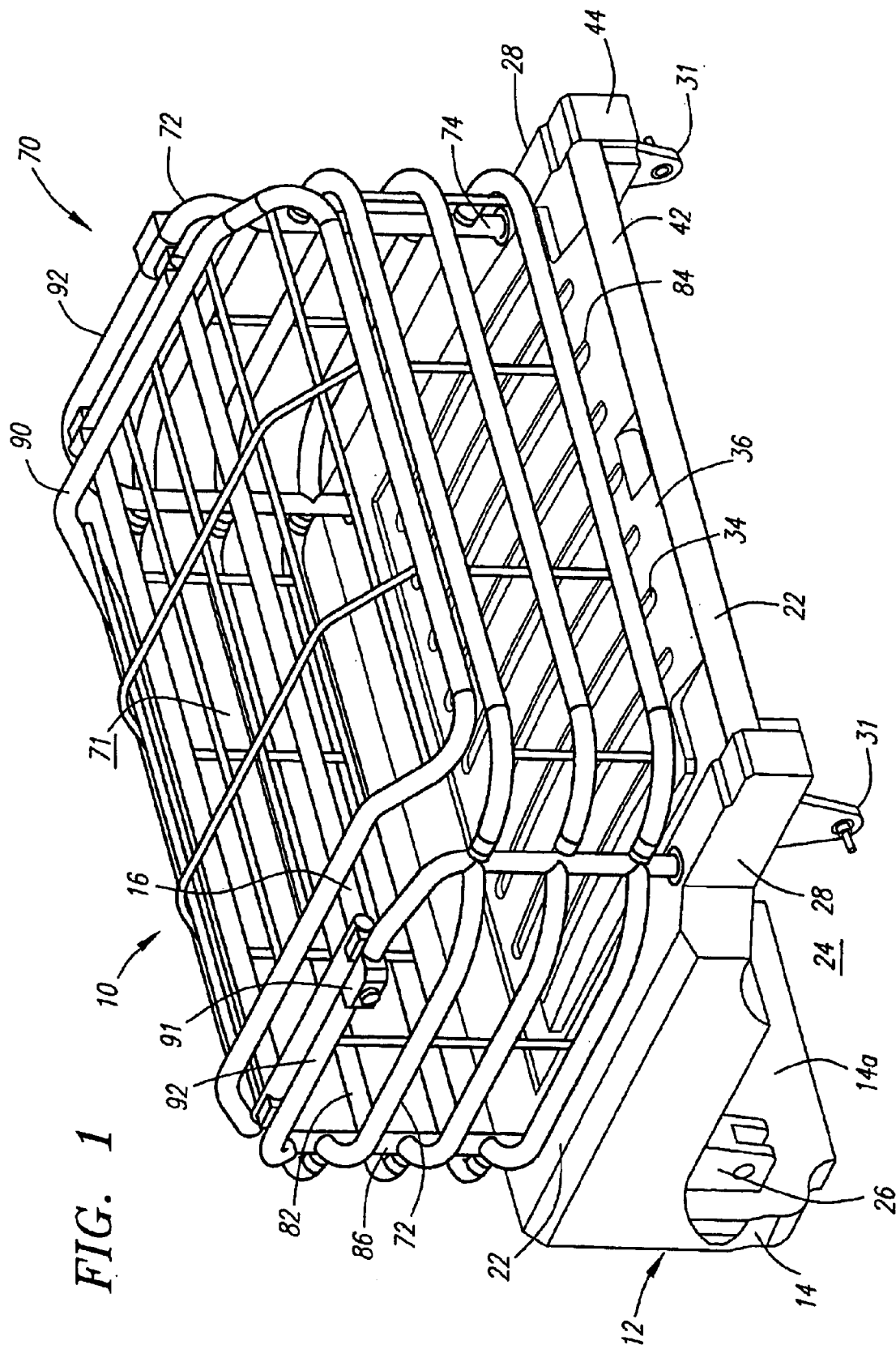
FIG. 1 is a perspective view of a preferred embodiment of a storage apparatus including a base and a cage, in accordance with the present invention.

Connectors may be provided on respective mating surfaces 50 of the base subassemblies 46a, 46b that may used to secure the base subassemblies 46a, 46b together when being assembled into the base 12 shown in FIG. 1. For example, as best seen in FIGS. 4A and 4B, the base subassemblies 46a, 46b may include one or more flanges 48a–48c extending from the mating surfaces 50. Alternatively, the mating surfaces 50 may include mating tabs and slots, tongues and grooves, and the like (not shown), that may be interlocked with one another in addition to or instead of the flanges 48.

During assembly, the mating surfaces 50 may be butted against one another, and the flanges 48 aligned with one another. Fasteners, e.g., bolts, screws, and the like (not shown), may be introduced through holes 49 in the flanges 48 to attach the base subassemblies 46a, 46b to one another. Alternatively, an adhesive or other bonding material may be used between the mating surfaces 50 of the base subassemblies 46a, 46b in addition to or instead of the connectors and/or fasteners described above.

Figure 2B:
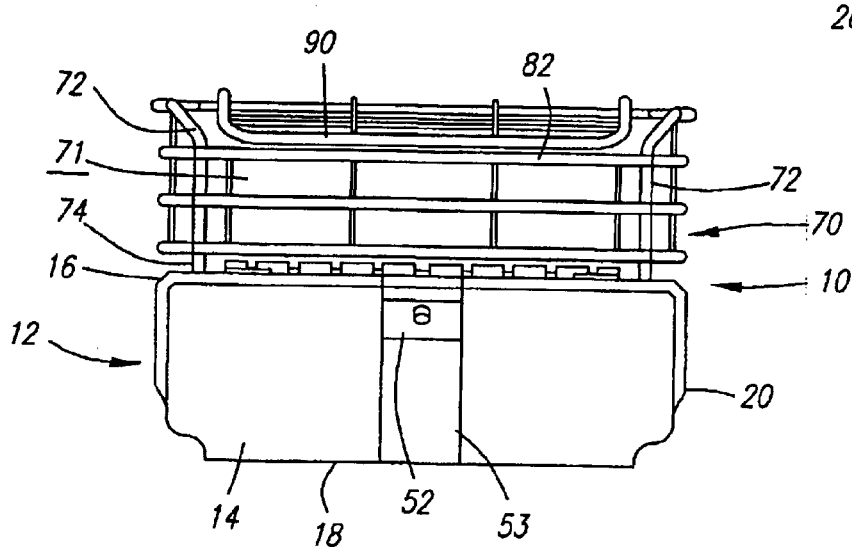
Figure 2C:
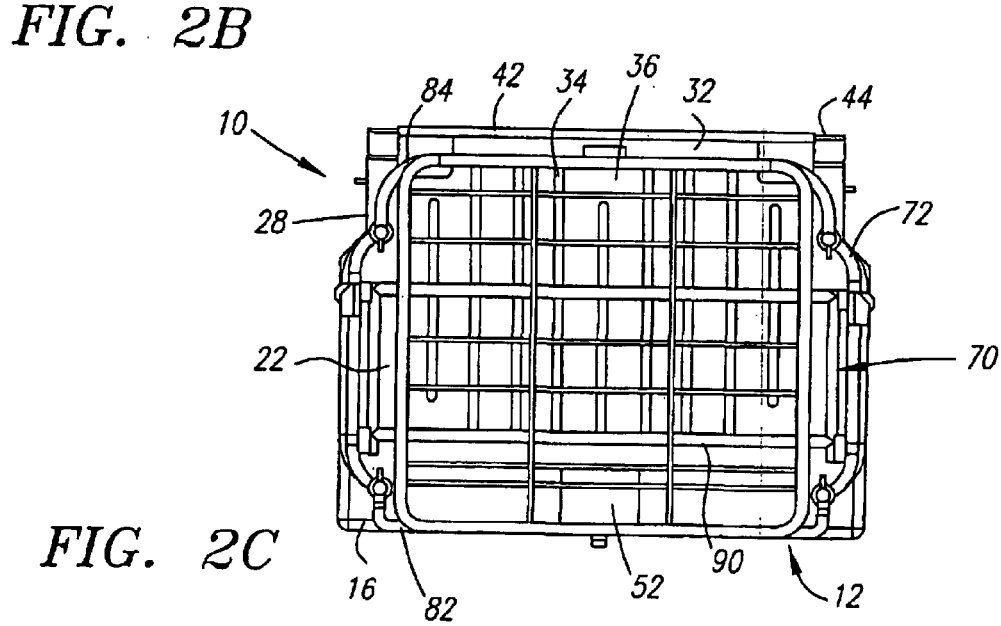

Optionally, with particular reference to FIGS. 2B and 4A, one or more storage compartments 52 may be attached to or otherwise mounted within the base 12. For example, the storage compartment 52 may include mounting brackets or flanges (not shown), and one or both of the base subassemblies 46a, 46b may include complementary flanges 54. The storage compartment 52 may be inserted into a space defined between the base subassemblies 46a, 46b, either before or after assembling the base subassemblies 46a, 46b. Fasteners, such as bolts or screws (not shown) may be inserted through the flanges and/or brackets to secure the storage compartment 52 in place. Thus, the base subassemblies 46a, 46b may be attached directly to one another with the storage compartment 52 attached to one or both of the base subassemblies 46a, 46b.

Alternatively, the storage compartment 52 may be provided in a compartment panel 53 (see FIG. 2B) that is disposed between the base subassemblies 46a, 46b. The compartment panel 53 may have a height similar to the height of the front panel 16 of the base 12. The mating surfaces 50 of the base subassemblies 46a, 46b may be attached to respective surfaces (not shown) of the compartment panel 53, thereby assembling the base 12 into the configuration shown in FIG. 23. Preferably, the base subassemblies 46a, 46b and the compartment panel 53 have a combined width that corresponds to a width of a load deck of a vehicle into which the base 12 is installed, as will be appreciated by those skilled in the art.

The storage compartment 52 may include a door that may be latched and/or locked to securely store articles within the storage compartment 52. Alternatively or in addition, one or more storage compartments (not shown) may be mounted elsewhere into the base 12, e.g., into the front panel 14 and/or the top panel 22.

Figure 5A:
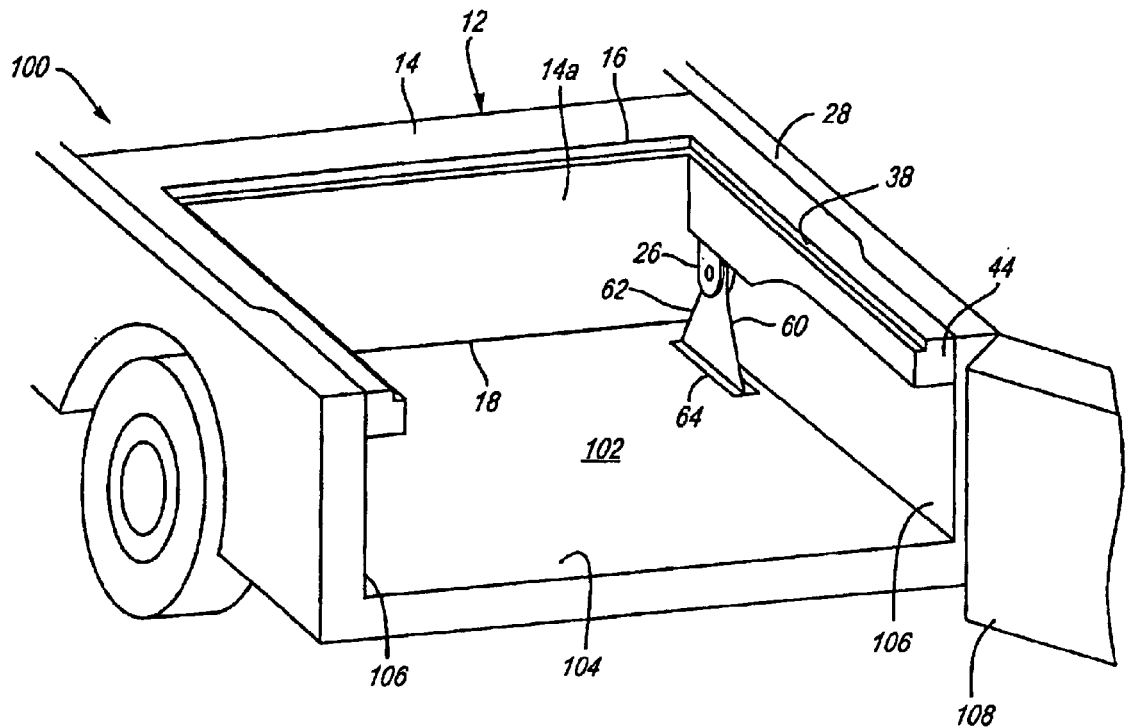
FIG. 5A is a perspective view of a load deck of an open deck vehicle in which the base of FIG. 3 is mounted.
Figure 5B:
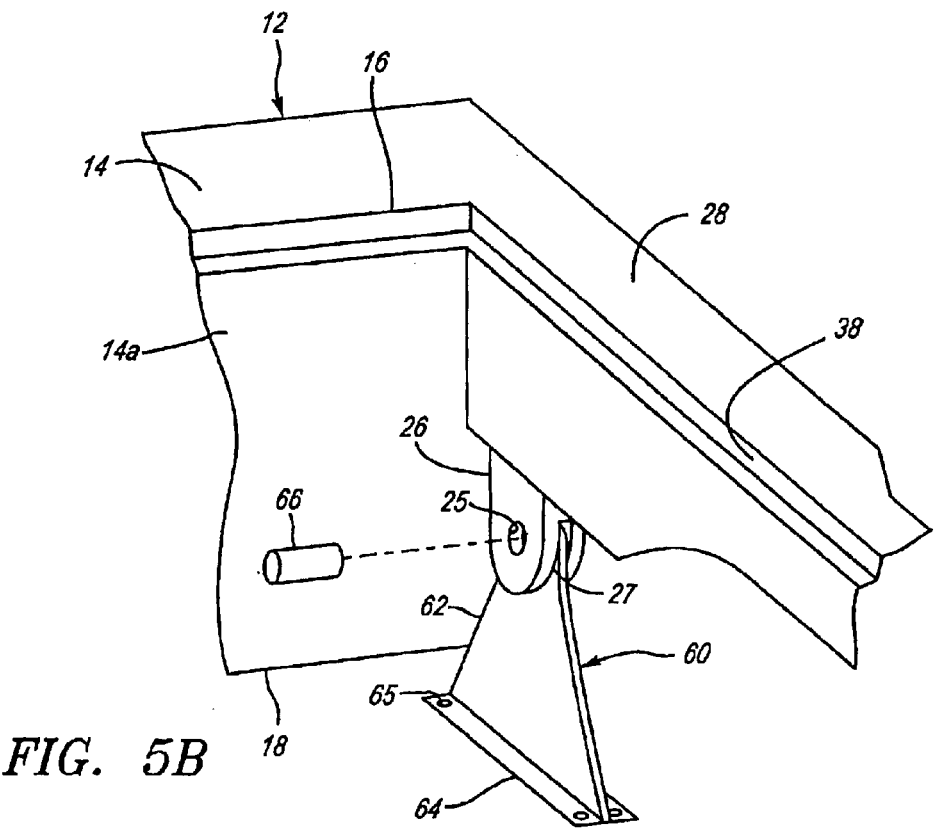
FIG. 5B is a detail of a mount of the base of FIG. 5A being secured to the load deck using a bracket.

Turning to FIGS. 5A and 5B, the base 12 may be installed into a load deck 102 of a vehicle 100, such as a jeep, a sport utility vehicle, a pickup truck, and the like (not shown). Generally, the load deck of the vehicle includes a floor 104, side walls 106, and a tailgate 108. Any subassemblies, such as the base subassemblies 46a, 46b, may be attached to one another, as described above, to assemble the base 12. The base 12 may be placed in the load deck 102 with the front panel 16 oriented towards the front of the load deck (towards the front of the vehicle), and the rear ends 44 of the side portions 28 oriented towards the tailgate 106 (towards the rear of the vehicle).

One or more brackets 60, and preferably a pair of brackets 60 (only one shown in FIG. 5B) may be used to install the base 12 within the load deck 100. Generally, each bracket 60 includes a first leg portion 62 and a second base portion 64. The base portion 64 may include features for mounting the bracket 60 to the floor 104 of the load deck 100. For example, the base portion 64 may extend transversely relative to the leg portion 62. The base portion 64 may include slots or holes 65 therethrough for mounting the bracket directly to the floor 104 of the load deck 102. Thus, installation may involve drilling holes into the floor 104 of the load deck 100, whereupon fasteners, e.g., screws or bolts, may be fastened through the base portion 64 and the floor 104 to secure the bracket 60 in place.

In a preferred embodiment, however, the bracket 60 is an existing bracket that is already mounted to the load deck 102, thereby eliminating any need for drilling holes in the floor 104. For example, brackets 60 may already be available in the load deck 102 for installing other equipment, such as passenger seats (not shown).

Alternatively, the bracket 60 may be a custom bracket (not shown) having a predetermined configuration such that the bracket may be attached between an existing floor mount (not shown) and a corresponding mount on the base 12. For example, the load deck may include a pair of floor mounts, each including a "U" shaped base and one or more rods or other cross-members extending between arms of the base. The bracket may include a base portion including one or more hooks or claws that may be received at least partially around the cross-members to secure the bracket to one of the floor mounts. The bracket may include a latch for disengaging one or more of the hooks from the floor mount to allow removal of the bracket from the floor mount. The bracket may include a leg portion for connecting to the mount 26 on the base 12.

Thus, the bracket(s) 60 may be secured to the floor 104, and each mount 26 on the base 12 may then be aligned with a corresponding bracket 60. A pin or other fastener 66 may be used to secure the leg portion 62 of the bracket 60 to the mount 26. Preferably, the mount 26 includes a slot 27 for receiving at least a segment of the leg portion 62 therein, and the mount 26 and the leg portion 62 may include holes 25 through which the pin 66 may be inserted.

If additional stability or security is desired, the base 12 may be further secured to the load deck 102 of the vehicle 100. For example, the side portions 28 may include the side mounts 31 for attaching the side portions 28 to the side walls 106 of the load deck 102. Bolts and the like may inserted through apertures in the side mounts 31 and secured to side walls (not shown) of the load deck 102. Alternatively, the side portions 28 may include side panel extensions (not shown) that extend downwardly, e.g., generally towards the lower edge 18 of the front panel 14. The side panel extensions may include holes or slots (not shown) for receiving fasteners therethrough for attaching to the side walls 106. Alternatively, fasteners may be drilled, tapped, or otherwise inserted directly through the side portions 28 into the side walls 106.

When the base 12 is installed within the load deck 102, the lower edge 18 of the front panel 14 may abut or otherwise be in close proximity to the floor 104 of the load deck 102. The side portions 28 may extend along the side walls 104 and may be contoured to conform to the existing shape of the side walls 104, e.g., to accommodate wheel wells, and the like. Preferably, the height of the base 12 is such that the top panel 22 is relatively flush with a top of the side walls 104. Thus, the base 12 may substantially isolate at least a portion of the load deck 102 between the front panel 14 and the tailgate 108.

The cover panel 32 (not shown in FIG. 5A; see FIG. 1) may then be inserted between the side portions 28 and the tailgate 108 of the vehicle 100 closed. The tailgate 108 may abut or otherwise engage the rear ends 44 of the side portions 28 and/or the rear edge 42 of the cover panel 32, thereby preventing the cover panel 32 from being removed unless the tailgate 108 is open. Thus, a secure enclosed space 24 may be defined by the front and top panels 14, 22 of the base 12, together with the floor 104, side walls 106, and/or tailgate 108 of the load deck 102. Any articles (not shown) placed within the enclosed space 24 may be accessed by opening the tailgate 108. In addition, because the mounts 26 (and the optional side mounts 31) are located within the enclosed space 24, the mounts 26 may not be accessed except via the tailgate 108. Thus, the base 12 may not be removed from the load deck 102 or tampered with unless the tailgate 108 is open, thereby enhancing the security of the apparatus 10.

Figure 6:
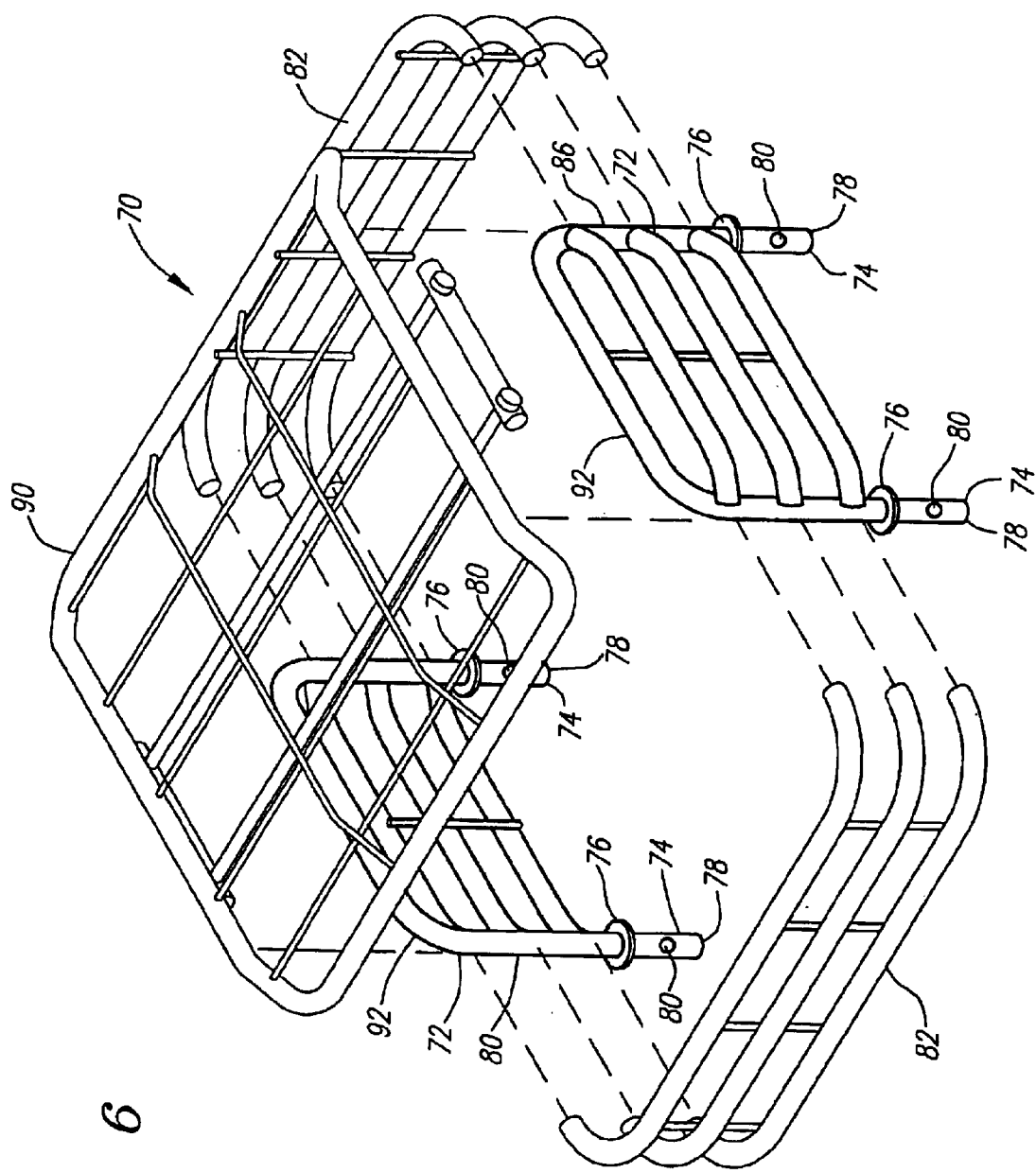
FIG. 6 is an exploded view of the cage of FIG. 1.

Turning to FIGS. 1 and 6, the apparatus 10 may also include a cage 70 that may be mounted to the base 12 such that the cage 70 defines a cage compartment 71 above the top panel 22. Generally, the cage 70 includes a plurality of frame segments that are mountable to the base 12 and/or to one another. For example, the cage 70 may include side frames 72 that include a plurality of hubs or legs 74 extending downwardly from the side frames 72. The legs 74 may include annular rings 76 or other radial extensions at a predetermined distance relative to ends 78 of the legs 74. The legs 74 may also include holes 80 therethrough adjacent the ends 78.

The base 12, e.g., each of the side portions 28, may include holes 29 therethrough (shown in FIG. 3) that are spaced apart similar to the spacing between the legs 74. The legs 74 may be inserted into the holes 29, thereby mounting the side frames 72 above respective side portions 28 of the base 12. Preferably, the ends 78 of the legs 74 extend through the base 12 and into the enclosed space 24. The annular rings 76 may limit insertion of the legs 74 such that the side frames 72 are disposed at a predetermined height above the side portions 28 of the base 12, while allowing the ends 78 of the legs 74 to be exposed within the enclosed space 24.

Pins, or other locking elements, e.g., bolts, screws, and the like (not shown), may be inserted through the holes 80 in the legs 74 for preventing the legs 74, and consequently the side frames 72 from being removed from the base 12. Because the pins are inserted through the legs 74 within the enclosed space 24, the cage 70 may be substantially secured to the base 12. If the pins are removable, the side frames 72 may be separated from the base 12 only upon having access to the enclosed space 24. As described above, access to the enclosed space 24 may be only be attained by opening the tailgate, thereby ensuring that unauthorized persons cannot gain access to the enclosed space 24 and/or remove the cage 70 if the tailgate is closed and/or locked.

Alternatively, the cage 70 may be secured to the base 12 by brackets or top mounts (not shown). For example, one or more brackets (not shown) may be provided on the top panel 22 to which the legs 74 or crossbars of the side frames 72 may be permanently or removably secured.

With the side frames 72 secured to the base 12, other frame segments may be mounted to the side frames 72 to define the cage compartment 71. For example, front and rear frames 82, 84 may be mounted between front and rear edges 86, 88, respectively, of the side frames 72, as shown in FIGS. 1 and 6. In addition, a top frame 90 may be mounted between top edges 92 of the side frames 72 to substantially enclose the cage 70. Optionally, a bottom frame (not shown) may be mounted between the side frames 72 to provide a bottom of the cage compartment 71 in addition to the top surface 36 of the cover panel 32.

The frame segments, e.g., the front, rear, and top frames 82, 84, 90, may be releasably connected to the side frames 72 or substantially permanently attached to the side frames 72. For example, the front and rear frames 82, 84 may be attached by cooperating tabs and slots (not shown). The tabs may extend from the front and rear edges 86, 88 of the side frames 72 and the slots may be formed into ends 94, 96 of the front and rear frames 82, 84. The ends 86, 88 may be received over the tabs until the tabs are engaged within the slots, thereby connecting the ends 86, 88 to the side frames 72. Alternatively, release pins (not shown) may be used to secure the ends 94, 96 of the front and rear frames 82, 84 to the front and rear edges 86, 88 of the side frames 72, respectively, either instead of or in addition to the tabs and slots.

In a further alternative, the top frame 90 may be pivotally mounted between the side frames 72. For example, if the top frame 90 is connected using release pins (not shown), one set of release pins may be disengaged, and the top frame 90 may be pivoted about another set of release pins to access the cage compartment 71.

Optionally, if additional security is desired, a lockable cover 91 (see FIG. 1) may be provided that may wrapped around a connection between the side frames 72 and a corresponding frame segment. For example, the cover 91 may encase a release pin (not shown) and/or a corresponding portion of a frame segment to prevent access to the pin. The cover 91 may be lockable in a closed position, e.g., by an attached lock, thereby preventing the pin from being withdrawn or otherwise disengaged from the corresponding frame segment.

Thus, a storage enclosure apparatus in accordance with the present invention may provide increased security for storing articles within a load deck of an open deck vehicle. In addition, because a cage in accordance with the present invention may be mounted to a surface of a vehicle, e.g., above the enclosed space defined by the base, the cage may increase the available storage capacity of an open deck vehicle, e.g., without having to stack articles on top of one another.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the spirit and scope of the appended claims.

What is claimed is:

1. An apparatus for carrying articles in a load deck of an open deck vehicle, the load deck being defined by a floor, side walls, and a tailgate, the apparatus comprising:
   a front panel defining an upper edge and a lower edge;
   a top panel extending transversely from the upper edge of the front panel, the front and top panels at least partially defining an enclosed space therebetween;
   a mount extending from the front panel within the enclosed space; and
   a bracket comprising a first portion secured to the mount, and a second portion extending towards the lower edge of the front panel, the second portion being attachable to a load deck of a vehicle for attaching the apparatus to the load deck, whereby the load deck further defines the enclosed space.

2. The apparatus of claim 1, wherein the top panel comprises side portions extending transversely from opposite ends of the upper edge of the front panel, thereby defining an opening between the side portions for accessing the enclosed space.

3. The apparatus of claim 2, wherein the top panel further comprises a removable cover panel disposed between the side portions.

4. The apparatus of claim 3, wherein at least one of the side portions and the cover panel include a tongue or groove for supporting the cover panel between the side portions.

5. The apparatus of claim 4, wherein the side portions and the cover panel include cooperating tongues and grooves for slidably inserting the cover panel between the side portions.

6. The apparatus of claim 5, wherein the cover panel is movable from a closed position substantially covering the enclosed space and an open position for providing access to the enclosed space via the opening.

7. The apparatus of claim 2, wherein the side portions comprise mounts for attaching to side walls of a load deck of a vehicle.

8. The apparatus of claim 7, wherein the mounts comprise side panels extending from the side portions generally towards the lower edge of the front panel, the side panels comprising apertures for receiving fasteners therethrough for attaching to side walls of a load deck of a vehicle.

9. The apparatus of claim 1, further comprising a cage secured to the base such that the cage defines a cage compartment above the top panel.

10. The apparatus of claim 9, wherein the cage comprises a plurality of legs extending into a portion of the top panel for supporting the cage above the top panel.

* * * * *